United States Patent [19]

Freitag et al.

[11] Patent Number: 4,704,430

[45] Date of Patent: Nov. 3, 1987

[54] THERMOPLASTIC MOULDING MATERIALS

[75] Inventors: Dieter Freitag; Werner Nouvertné; Peter Tacke, all of Krefeld; Klaus G. Wilms, Dormagen, all of Fed. Rep. of Germany

[73] Assignee: Bayer Aktiengesellschaft, Leverkusen, Fed. Rep. of Germany

[21] Appl. No.: 886,376

[22] Filed: Jul. 17, 1986

[30] Foreign Application Priority Data

Jul. 30, 1985 [DE] Fed. Rep. of Germany ....... 3527156
Oct. 29, 1985 [DE] Fed. Rep. of Germany ....... 3538389

[51] Int. Cl.$^4$ ............................................. C08L 69/00
[52] U.S. Cl. ........................................ 525/67; 525/69; 525/89; 525/92; 525/147; 525/148; 525/439; 525/902
[58] Field of Search ................... 525/67, 69, 147, 148, 525/394, 397, 439, 89, 92, 901, 902

[56] References Cited

U.S. PATENT DOCUMENTS

| 3,875,256 | 4/1975 | White | 525/394 |
| 4,482,672 | 11/1984 | Neuray et al. | 525/67 |
| 4,515,918 | 5/1985 | Nouvertne et al. | 524/504 |
| 4,539,370 | 9/1985 | Nouvertne et al. | 525/67 |

FOREIGN PATENT DOCUMENTS 107303 5/1984 European Pat. Off.
107048 5/1984 European Pat. Off.

Primary Examiner—Theodore Pertilla
Attorney, Agent, or Firm—Connolly and Hutz

[57] ABSTRACT

The present invention relates to thermoplastic moulding materials of (A) thermoplastic polycarbonates mixed with (B) thermoplastic polyalkylene terephthalates and, if appropriate, with (C) elastomeric polymers, which are characterized in that they contain (D) a polycarbonate-polyphenylene oxide block co-condensate.

4 Claims, 1 Drawing Figure

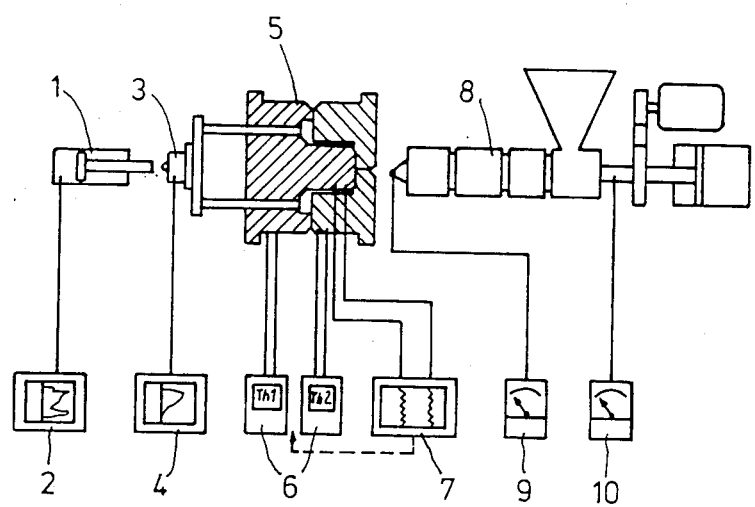

THERMOPLASTIC MOULDING MATERIALS

The present invention relates to thermoplastic moulding materials containing (A) 98 to 1% by weight, preferably 78 to 20% by weight and in particular 64 to 30% by weight, of thermoplastic, aromatic polycarbonates with weight-average molecular weights $M_w$ of between 10,000 and 200,000 ($M_w$ determined by light scattering), (B) 1 to 98% by weight, preferably 20 to 78% by weight and in particular 30 to 64% by weight, of thermoplastic polyalkylene terephthalates and, if appropriate, (C) 0 to 30, preferably 1 to 20 and in particular 3 to 12% by weight of an elastomeric polymer with a glass transition temperature of less than −20° C., which are characterized in that they contain (D) 1 to 30% by weight, preferably 1 to 20% by weight and in particular 3 to 15% by weight, of a polycarbonate-polyphenylene oxide block co-condensate, the sum of the percentages by weight of components (A)+(B)+(C)+(D) in each case being 100% by weight.

COMPONENTS (A) TO (D)

Component (A)

Aromatic polycarbonates (A) in the context of this invention are understood as the known homopolycarbonates, copolycarbonates and mixtures of these polycarbonates which are based, for example, on at least one of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)ethers, bis-(hydroxyphenyl)-ketones, bis-(hydroxyphenyl)sulphoxides, bis-(hydroxyphenyl)sulphones and α,α'-bis-(hydroxyphenyl)-diisopropylbenzenes, and their nuclear-alkylated and nuclear-halogenated derivatives. These and other suitable diphenols are described, for example, in U.S. Pat. Nos. 3,028,365, 3,275,601, 3,148,172, 3,062,781, 2,991,273 and 2,999,846.

Preferred diphenols are, for example, 4,4'-dihydroxydiphenyl, 2,4-bis-(4-hydroxyphenyl)-2-methylbutane, α-α'-bis-(4-hydroxyphenyl)-p-diisopropylbenzene, 2,2-bis-(3-methyl-4-hydroxyphenyl)-propane and 2,2-bis-(3-chloro-4-hydroxyphenyl)-propane.

Particularly preferred diphenols are, for example, 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The aromatic polycarbonates (A) can be branched by incorporating small amounts, preferably 0.05 to 2.0 mol % (based on the diphenols employed) of compounds which are trifunctional or more than trifunctional, for example those with three or more than three phenolic hydroxyl groups.

The aromatic polycarbonates (A) should as a rule have average molecular weights $\overline{M}_w$ (weight average) of 10,000 to 200,000, preferably 20,000 to 80,000, determined by measuring the relative viscosity in methylene chloride at 25° C. and a concentration of 0.5 g in 100 ml of solution, or determined by light scattering.

Small amounts of low molecular weight polycarbonates, for example with an average degree of polycondensation of 2 to 20, can also be admixed to the high molecular weight polycarbonates with an $\overline{M}_w$ of 10,000 to 200,000.

Chain stoppers, such as, for example, phenol, halogenophenols or alkylphenols, carboxylic acid chlorides and phenylchlorocarbonic acid esters are employed in the calculated amounts in a known manner in order to establish the molecular weight $\overline{M}_w$ of the polycarbonates (A). Preferred chain stoppers are described in DE-OS (German Published Specifiction) 2,842,005.

The polycarbonates (A) to be employed according to the invention are prepared in a known manner either by the phase boundary process or by the process in homogeneous solution (pyridine process), or, if appropriate, by the melt transesterification process.

Component B

Polyalkylene terephthalates (B) in the context of the invention are reaction products of aromatic dicarboxylic acids or their reactive derivatives (for example dimethyl esters or anhydrides) and aliphatic, cycloaliphatic or araliphatic diols and mixtures of these reaction products.

Preferred polyalkylene terephthalates (B) can be prepared from terephthalic acid (or its reactive derivatives) and aliphatic or cycloaliphatic diols with 2 to 10 C atoms by known methods (Kunststoff-Handbuch (Plastics Handbook), Volume VIII, page 695 et seq., Carl Hanser Verlag, Munich 1973).

Preferred polyalkylene terephthalates (B) contain at least 80, preferably at least 90 mol %, based on the dicarboxylic acid component, of terephthalic acid radicals and at least 80, preferably at least 90 mol %, based on the diol component, of ethylene glycol and/or butane-1,4-diol radicals.

The preferred polyalkylene terephthalates (B) can contain, in addition to terephathalic acid esters, up to 20 mol % of radicals of other aromatic dicarboxylic acids with 8 to 14 C atoms or aliphatic dicarboxylic acids with 4 to 12 C atoms, such as, for example, radicals of phathalic acid, isophthalic acid, naphthalene-2,6-dicarboxylic acid, 4,4'-diphenyldicarboxylic acid, succinic, adipic or sebacic acid, azelaic acid or cyclohexanediacetic acid.

The preferred polyalkylene terephthalates (B) can contain, in addition to ethylene glycol or butane-1,4-diol radicals, up to 20 mol % of other aliphatic diols with 3 to 12 C atoms or cycloaliphatic diols with 6 to 21 C atoms, for example radicals of propane-1,3-diol, 2-ethylenepropane-1,3-diol, neopentylglycol, pentane-1,5-diol, hexane-1,6-diol, cyclohexane-1,4-dimethanol, 4-methylpentane-2,4-diol, 2-methylpentane-2,4-diol, 2,2,4-trimethylpentane-1,3- and -1,5-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxy-ethoxyphenyl)-propane and 2,2-bis-(4-hydroxypropxyphenyl)-propane (DE-OS (German Published Specification) 2,407,674, 2,407,776 and 2,715,932).

The polyalkylene terephthalates (B) can be branched by incorporating relatively small amounts of tri- or tetrahydric alcohols or tri- or tetrabasic carboxylic acids, such as are described, for example, in DE-OS (German Published Specification) 1,900,270 and U.S. Pat. No. 3,692,744. Examples of the preferred branching agents are trimesic acid, trimellitic acid, trimethylolethane and -propane and pentaerythritol.

It is advisable to use not more than 1 mol % of the branching agent, based on the acid components.

Particularly preferred polyalkylene terephthalates (B) are those which have been prepared solely from terephthalic acid and reactive derivatives thereof (for example dialkyl ester thereof) and ethylene glycol and/or butane-1,4-diol, and mixtures of these polyalkylene terephthalates.

Preferred polyalkylene terephthalates (B) are also copolyesters which are prepared from at least two of the abovementioned acid components and/or from at least two of the abovementioned alcohol components; particularly preferred copolyesters are poly-(ethylene glycol/butane-1,4-diol) terephthalates.

The polyalkylene terephthalates preferably used as component (B) in general have an intrinsic viscosity of 0.4 to 1.5 dl/g, preferably 0.5 to 1.3 dl/g and in particular 0.6 to 1.2 dl/g, in each case measured in phenol/o-dichlorobenzene (1:1 parts by weight) at 25° C.

Component C

The polymers (C) with a glass transistion temperature of less than −20° C. comprise copolymers—in particular graft copolymers—with elastomeric properties, which are essentially obtainable from at least 2 of the following monomers: chloroprene, butadiene, isoprene, isobutene, styrene, acrylonitrile, ethylene, propylene, vinyl acetate and (meth)acrylic acid esters with 1 to 18 C atoms in the alcohol component; that is to say polymers such as are described, for example, in "Methoden der Organischen Chemie" ("Methods of Organic Chemistry"), (Houben-Weyl), Volume14/1, Georg Thieme Verlag, Stuttgart 1961, pages 393–406 and in C. B. Bucknall, "Toughened Plastics", Appl. Science Publishers, London 1977. Preferred polymers (C) have a gel content of more than 20 and preferably more than 40% by weight.

Preferred polymers (C) are ethylene/vinyl acetate copolymers with 15 to 45% by weight of vinyl acetate radicals and melt indices from not capable of flow to 1,000, preferably from 0.1 to 20, measured at 190° C. under a load of 2.16 kp in accordance with DIN 53 735.

Polymers (C) which are likewise preferred are ethylene/propylene copolymers and ethylene/propylene/diene terepolymers (EPM and EPDM rubbers), in which the weight ratio of ethylene to propylene radicals is in the range from 40:60 to 90:10, preferably 40:60 to 65:35.

The Mooney viscosities (minutes of running time$_{1+4}$/100° C.) of the non-crosslinked EPM and EPDM rubbers are between 25 and 100, preferably between 35 and 90. The gel contents of the non-crosslinked EPM and EPDM rubbers are less than 1% by weight.

The ethylene/propylene copolymers (EPM) used contain virtually no double bonds, whilst the ethylene/propylene/diene terpolymers (EPDM) can contain 1 to 20 double bonds/1,000 C atoms. Examples which may be mentioned of suitable diene monomers in the EPDM are: conjugated dienes, for example isoprene and butadiene, and non-conjugated dienes with 5 to 25 C atoms, for example 1,4-pentadiene, 1,4-hexadiene, 1,5-hexadiene, 2,5-dimethyl-1,5-hexadiene and 1,4-octadiene; cyclic dienes, for example cyclopentadiene, cyclohexadiene, cyclooctadiene and dicyclopentadiene; alkenylnorbornenes, for example 5-ethylidene-2-norbornene, 5-butylidene-2-norbornene, 2-methallyl-5-norbornene and 2-isopropenyl-5-norbornene, and tricyclodienes, for example 3 methyl-tricyclo-(5,2,1,0,2,6)-3,8-decadiene. The non-conjugated dienes hexa-1,5-diene, ethylidenenorbornene or dicyclopentadiene may be mentioned as preferred. The diene content in the EPDM is preferably 0.5 to 10% by weight. EPM and EPDM rubbers are described, for example, in DE-OS (German Published Specification) 2,808,709.

Other preferred polymers (C) are selectively hydrogenated block copolymers of a vinylaromatic monomer (X) and a conjugated diene (Y) of a block of polymerized vinylaromatic and a block of the polymerized diene, that is to say of the X-Y type. These block copolymers and their preparation are known.

The procedures described in "Encyclopedia of Polymer Science and Technology", Volume 15, Interscience, N.Y. (1971) on pages 508 et seq. can in general be used for the preparation of suitable X-Y block copolymers of styrene, α-methylstyrene, vinyltoluene or mixtures and of conjugated dienes, such as butadiene and isoprene. The selective hydrogenation of such products is likewise known; the ethylenic double bonds are thereby essentially completely hydrogenated, and the aromatic double bonds are largely retained. Such selectively hydrogenated block copolymers are described, for example, in DE-OS (German Published Specification) 3,000,282.

Preferred polymers (C) are furthermore, for example, styrene- and/or acrylonitrile- and/or (meth)acrylic acid alkyl ester-grafted polybutadienes, butadiene/styrene copolymers and poly(meth)acrylic acid esters, for example copolymers of styrene or alkylstyrene and conjugated dienes (high impact polystyrene), that is to say copolymers of the type described in DE-OS (German Published Specification) 1,694,173 (=U.S. Pat. No. 3,564,077), with acrylic or methacrylic acid esters, vinylacetate, acrylonitrile, styrene and/or butadiene/acrylonitrile copolymers, polyisobutenes or polyisoprenes, such as are described, for example, in DE-OS (German Published Specification) 2,348,377 (=U.S. Pat. No. 3,919,353).

Particularly preferred polymers (C) are ABS polymers (both of the copolymer and of the graft polymer type), such as are described, for example, in DE-OS (German Published Specification) 2,035,390 (=U.S. Pat. No. 3,644,574) or in DE-OS (German Published Specification) 2,248,242 (=British Patent Specification 1,409,275).

Particularly preferred polymers (C) are also graft polymers which are obtainable by a grafting reaction of I. 10 to 40, preferably 10 to 35, in particular 15 to 25% by weight, based on the grafted product, of at least one (meth)acrylic acid ester and/or a mixture of 10 to 35, preferably 20 to 35% by weight, based on the mixture, of acrylonitrile and 65 to 90, preferably 65 to 80% by weight, based on the mixture, of styrene on II. 60 to 90, preferably 65 to 90, in particular 75 to 85, % by weight, based on the grafted product, of a butadiene polymer with at least 70% by weight, based on II, of butadiene radical as the graft base, wherein, preferably, the gel content of the graft base II is ≧70% (measured in toluene), the degree of grafting G is 0.15 to 0.55 and the average particle diameter $d_{50}$ of the graft polymer (C) is 0.2 to 0.6, preferably 0.3 to 0.5 $\neq$m.

(Meth)acrylic acid esters I are, in particular, esters of acrylic acid and methacryic acid with monohydric alcohols with 1 to 8 C atoms.

The graft base II can contain, in addition to butadiene radicals, up to 30% by weight, based on II, of radicals of other ethylenically unsaturated monomers, for example styrene, acrylonitrile or esters of acrylic or methacrylic acid with 1–4 C atoms in he alcohol component (such as methyl acrylate, ethyl acrylate, methyl methacrylate and ethyl methacrylate). The preferred graft base II consists of pure polybutadiene.

In the graft polymerization, as is known, the grafting monomers I are not grafted completely onto the graft base II. According to the invention, graft polymers are understood as the products of graft polymerization, that is to say also those products which, in addition to the actual graft polymerizates, also contain homo- and copolymers of the graft monomers I employed.

The degree of grafting G designates the weight ratio of grafted-on grafting monomers to graft base and has no dimensions.

The average particle size $d_{50}$ is the diameter, above and below which in each case 50% by weight of the particles lie. It can be determined by means of ultracentrifuge measurement (W. Scholtan, H. Lange, Kolloid. Z. und Z. Polymere 250 (1972), 782–796) or by means of electron microscopy and subsequent particle counting (G. Kämpf, H. Schuster, Angew. Makromoloekulare Chemie 14, (1970), 111–129) or by means of light scattering measurements.

Particularly preferred polymers (C) are, for example, also graft polymers of (a) 25 to 98% by weight, based on (C), of acrylate rubber with a glass transition temperature of less than $-20°$ C. as the graft base and (b) 2 to 75% by weight, based on (C), of at least one polymerizable ethylenically unsaturated monomer, of which the homo- or copolymers formed in the absence of (a) would have a glass transition temperature of more than 25° C., as grafting monomers.

The acrylate rubbers (a) of the polymers (C) are preferably polymers of acrylic acid alkyl esters, if appropriate with up to 40% by weight of other polymerizable ethylenically unsaturated monomers. If the acrylate rubbers employed as the graft base (a) are in turn already grafted products with a diene rubber core, the diene rubber core is not included in the calculation of this percentage. Preferred polymerizable acrylic acid esters include $C_1$–$C_8$-alkyl esters, for example methyl, ethyl, butyl, octyl and 2-ethylhexyl esters, halogenoalkyl esters, preferably halogeno-$C_1$–$C_8$-alkyl esters, such as chloroethyl acrylate, and aromatic esters, such as benzyl acrylate and phenethyl acrylate. They can be employed individually or as a mixture.

The acrylate rubbers (a) can be non-crosslinked or crosslinked, and are preferably partially crosslinked.

For crosslinking, monomers with more than one polymerizable double bond can be copolymerized. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as, for example, ethylene glycol dimethyl acrylate and allyl methacrylate; polyunsaturated heterocyclic compounds, such as, for example, trivinyl and triallyl cyanurate and isocyanurate and tris-acryloyl-s-triazines, in particular triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethyacrylate, diallyl phthalate and heterocylic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amounts of the crosslinking monomers is preferably 0.02 to 5 and in particular 0.05 to 2% by weight, based on the graft base (a).

In the case of cyclic crosslinking monomers with at least 3 ethylenically unsaturated groups, it is advantageous to limit the amount to <1% by weight of the graft base (a).

Preferred "other" polymerizable ethylenically unsaturated monomers which, in addition to the acrylic acid esters, can be used, if appropriate, for the preparation of the graft base (a) are, for example, acrylonitrile, styrene, $\alpha$-methylstyrene, acrylamides and vinyl $C_1$–$C_6$-alkyl ethers. Preferred acrylate rubbers as the graft base (a) are emulsion polymers which have a gel content of $\geq 60\%$ by weight.

The gel content of the graft base (a) is determined at 25° C. in dimethylformamide (M. Hoffmann, H. Krömer, R. Khuh, Polymeranalytik I und II (Polymer analysis I and II), Georg Thieme Verlag, Stuttgart 1977).

Acrylate rubbers as the graft base (a) can also be products which contain a crosslinked diene rubber of one or more conjugated dienes, such as polybutadiene, or a copolymer of a conjugated diene with an ethylenically unsaturated monomer, such as styrene and/or acrylonitrile, as the core.

The content of polydiene core in the graft base (a) can be 0.1 to 80, preferably 10 to 50% by weight, based on (a). The shell and core can be non-crosslinked, partly crosslinked or highly crosslinked, independently of one another.

Particularly preferred graft bases (a) for graft polymers (C) based on polyacrylic acid esters may be summarized below:

1. acrylic acid ester polymers and copolymers without a diene rubber core and
2. acrylic acid ester polymers and copolymers which contain a diene rubber core.

The grafting yield, that is to say the quotient of the amount of the grafted-on monomer (b) and the amount of the grafted monomer (b) employed is as a rule 20 to 80% by weight. The determination can be carried out as described by M. Hoffmann, H. Krömer and R. Kuhn, Polymeranalytik (Polymer Analysis), Volume 1, Georg Thieme Verlag, Stuttgart 1977.

Preferred grafting monomers (b) are $\alpha$-methylstyrene, styrene, acrylonitrile, methyl methacrylate or mixtures of these monomers. Preferred grafting monomer mixtures are those of styrene and acrylonitrile in a weight ratio of 90:10 to 50:50.

Such graft polymers (C) basd on polyacrylic acid esters are described, for example, in DE-AS (German Published Specification) 2,444,584 (=U.S. Pat. No. 4,022,748) and in DE-OS (German Published Specification) 2,726,256 (=U.S. Pat. No. 4,096,202).

Particularly advantageous graft polymers of this type are obtained if 2 to 20, preferably 2 to 15% by weight, based on (C), of monomers (b) are grafted onto 80 to 98, preferably 85 to 97% by weight, based on (C), of the completely broken latex of (a) suspended in water, in the absence of a suspending agent. The pulverulent graft polymer obtained can then be dried and homogenized with the other components in the desired ratio, under the action of shear forces in a manner that the average particle size $d_{50}$ of (C) in the mixture according to the invention is 0.05 to 3 μm, preferably 0.1 to 2 and in particular 0.2 to 1 μm.

The expression "in the absence of a suspending agent" means the absence of substances which, according to their nature and amount, can suspend the grafting monomers (b) in the aqueous phase. The definition does not exclude the presence of substances which, for example, have acted as suspending agents in the preparation of a grafted graft base (a); in such cases, the coagulating or precipitating agent used to break the latex (a) must be added in an amount which compensates the suspending action of the substances employed in the preliminary stage; in other words. It must be ensured that grafting monomers (b) do not give a (stable) emulsion in the aqueous phase.

A graft polymer (C) prepared in this manner in the absence of a suspending agent can, as a constituent of the moulding materials according to the invention, be dispersed in the other resin components to an exceptionally low particle size, which even survives a relatively long processing time at a higher temperature relatively unchanged.

The expression "exceptionally low particle size" means that the number, shape and size of the graft polymer particles to be used still largely coincide with the number, shape and size of the graft polymer particles introduced into the other molten resin components, even after homogenization.

Those acrylate rubbers which are obtained as an aqeuous emulsion (latex), the latex particles of which contain 1 to 20% by weight, preferably 1 to 10% by weight, based on (a), of monomers which are already grafted on in aqueous emulsion and of which homo- or copolymers would have glass transition temperatures of >0° C. can also be used as the graft base (a).

Preferred grafted-on monomers of this type are alkyl acrylates, alkyl methacrylates, styrene, acrylonitrile, α-methylstyrene and/or vinyl acetate.

Such graft bases (a) are prepared, for example, by emulsion polymerization or emulsion graft polymerization. They can also be prepared, however, by preparing an acrylate rubber in solution or in bulk and then grafting on the grafting monomers and subsequently transferring these rubbers to an aqueous emulsion suitable for further grafting processes.

Preferred suitable graft bases (a) for acrylate rubbers of this particular embodiment are thue, in addition to the polymers previously listed, also graft polymers, prepared in aqueous emulsion, of acrylic acid ester polymers or copolymers, containing, if appropriate, a diene rubber core, and ethylenically unsaturated polymerizable monomers.

Component (D)

Polycarbonate-polyphenylene oxide block condensates in the context of the present invention are polymers which contain 5% by weight to 95% by weight, based on the total weight of bifunctional structural units of the block condensate, of structural units of the formula (I)

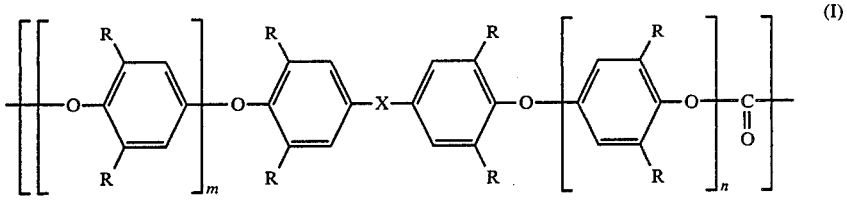

wherein
the radicals R are identical or different and represent hydrogen or an alkyl radical with 1 to 4 C atoms,
X represents a group

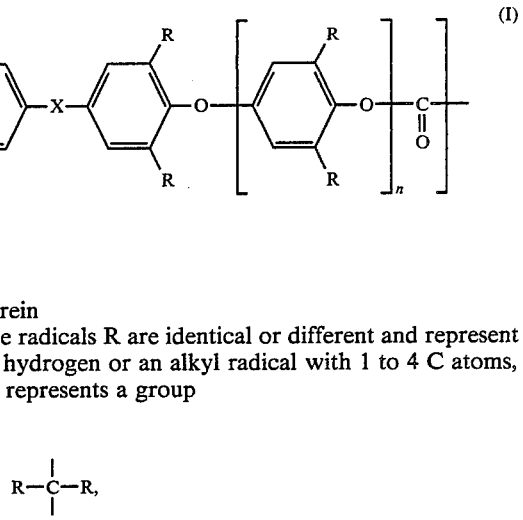

—O—, —S— or —SO$_2$— and
"m" and "n" represent an integer from 1 to 200, and 95% by weight to 5% by weight, based on the total weight of bifunctional structural units of the block condensate, of other structural units of the formula (II)

wherein —O—Z—O— is a diphenolate radical which has 6 to 30 C atoms.
Preferred diphenolate radicals —O—Z—O— are those of the formula (III)

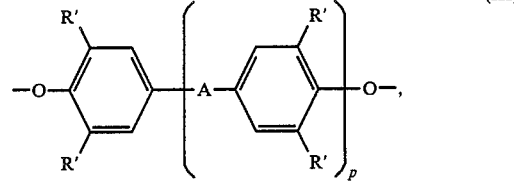

wherein
A is a single bond, C$_1$–C$_6$-alkylene, C$_2$–C$_6$-alkylidene, C$_5$–C$_6$-cycloalkylidene,

—SO$_2$ or a radical of the formula (a)

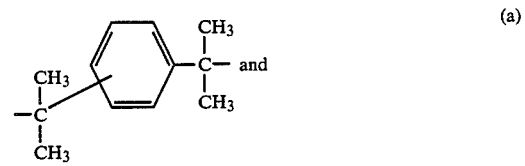

wherein the radicals R' are identical or different and are H, CH₃, Cl or Br and p is zero or 1.

These block condensates and their preparation are described in German Patent Application P 34 45 440.3 (Le A 23 440) and P 35 25 337.1 (Le A 23 104). They are prepared by the known phase boundary process for the preparation of aromatic, thermoplastic polycarbonates from known (see DE-OS (German Published Specification) 3,308,421) polyphenylene oxides of the formula (Ia)

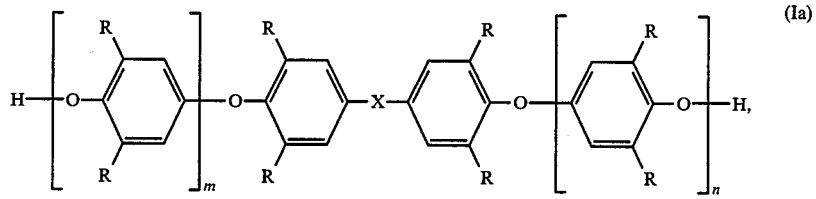

wherein R, X, m and n have the meaning given in the case of formula (I), with other diphenols $$HO-Z-OH \qquad (IIa)$$

chain stoppers, phosgene and, if appropriate, branching agents.

The organic phase of the phase boundary process consists, for example, in a known manner, of $CH_2Cl_2$, chlorobenzene or mixtures thereof.

The aqueous alkaline phase in general has a pH value of 8 to 14, preferably 9 to 13.

The volume ratio of organic to inorganic phase is in general 1:6 to 1:1.

The amount of organic phase is in general chosen so that the resulting block polyether-polycarbonate is obtained as a 0.5 to 20 percent strength by weight solution.

The molar amount of phosgene is up to 150 mol %, based on the total moles of diphenol components employed.

Suitable catalysts for the preparation process are tertiary amines and/or quaternary ammonium salts and/or quaternary phosphonium salts in amounts of 0.01 to 5 mol %, based on the total moles of diphenol components employed.

Preferred catalysts are triethylamine, tetrabutylammonium bromide and N-ethylpiperidine.

The aromatic block polyether-polycarbonates prepared in accordance with German Patent Application P 34 45 440.3 and P 35 25 337.1 are isolated in the customary manner by evaporation of the isolated and purified organic phase from the phase boundary process, if appropriate in a vacuum extruder.

The polyether-polycarbonates or polycarbonate-polyphenylene oxide block condensates of German Patent Application P 34 45 440.3 or P 35 25 337.1 as a rule have relative solution viscosities of 0.8 to 2, in particular 1.2 to 1.5, measured on a solution of 0.5 g of substance in 100 ml of $CH_2Cl_2$ solution. They can be processed to shaped articles of high quality at temperatures between 250° C. and 380° C. by injection moulding on commercially available machines. They can also be extruded to semi-finished products by extrusion at temperatures between 250° C. and 380° C. on customary extruders.

Further details on these block condensates their preparation and their industrial use are described in German Patent Application P 34 45 440.3 and P 35 25 337.1.

The incorporation of polyphenylene ether blocks into polycarbonates by the phase boundary process is also described in DE-OS (German Published Specification) 3,211,636.

In the present connection, preferred amounts by weight of (I) are 10 to 95% by weight and of (II) are accordingly 90% by weight to 5% by weight.

Polycarbonate-polyphenylene oxide block condensates in the context of the present invention are also polymers which contain 2% by weight to 50% by weight, preferably 5% by weight to 30% by weight, based on the total weight of the block condensate, of monofunctional structural units of the formula (IV.1) respectively (IV.2)

$$H-\left[\begin{array}{c} R'' \\ \phantom{x} \\ R'' \end{array}\right]_r O- \qquad (IV.1)$$

$$H-\left[\begin{array}{c} R'' \\ \phantom{x} \\ R'' \end{array}\right]_r O-\underset{O}{\overset{\parallel}{C}}-, \qquad (IV.2)$$

wherein
the radicals R" are identical or different and represent hydrogen or an alkyl radical with 1–4C atoms and
"r" is an integer from 4 to 100, preferably from 6 to 30, and 50% by weight to 98% by weight, preferably 70% by weight to 95% by weight, based on the total weight of the block condensate, of structural units of the formula (II).

Such polycarbonate-polyphenylene oxide block condensates can in turn be prepared by the phase boundary process in a known manner, from corresponding polyphenylene oxides (IVa)

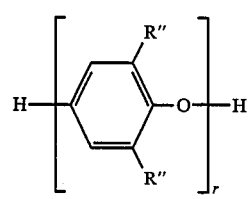

wherein R" and "r" have the meaning given in the case of formula (IV.1) respectively (IV.2),
diphenols $$HO-Z-OH \qquad (IIa)$$

and phosgene (see, for example, DE-OS (German Published Specification) 3,211,636).

The monofunctional polyphenylene oxides (IVa) are known from the literature or can be prepared by processes which are known from the literature (see, for example, DE-OS (German Published Specification) 3,211,636, DE-OS (German Published Specification) 2,126,434 and U.S. Pat. No. 3,306,875). Thus, for example, monofunctional polyphenylene oxides of the formula (IVa) can be prepared by oxidation of corresponding phenols (IVb)

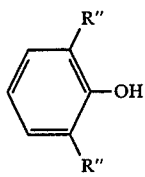

with oxygen (for example air) in the presence of catalyst combinations of copper salts and tertiary amines.

The polycarbonate-polyphenylene oxide block condensates with structural units of the formula (IV.1) respectively (IV.2) in turn as a rule have relative solution viscosities of 0.8 to 2, in particular 1.2 to 1.5, measured on a solution of 0.5 g of substance in 100 ml of $CH_2Cl_2$ solution.

These block condensates with structural units of the formula (IV.1) respectively (IV.2) can be processed by injection moulding or extrusion of commercially available machines.

The monofunctional polyphenylene oxides of the formula (IVa) to be empolyed have average number-average molecular weights of $\overline{M}_n$ of 500 to 10,000, preferably 800 to 3,000; the bifunctional polyphenylene oxides of the formula (Ia) to be employed have average number-average molecular weights $\overline{M}_n$ of 600 to 3,000, preferably of 800 to 1,500, it being possible to measure $\overline{M}_n$ in both cases by the method of osmometry in $CH_2Cl_2$ as the solvent.

The diphenols (IIa) are either known or can be prepared by known processes. Preferred diphenols (IIa) are bisphenol A=2,2-bis-(4-hydroxyphenyl)-propane, tetramethylbisphenol A, 1,1-bis-(4-hydroxyphenyl)-isobutane, 1,1-bis-(4-hydroxyphenyl)-cyclohexane, 4,4'-dihydroxydiphenyl sulphide, 4,4'-dihydroxydiphenyl sulphone and di- and tetrahalogenated derivatives thereof. Bisphenol A is particularly preferred. It is also possible to use any desired mixtures of the diphenols mentioned.

Preferred chain stoppers for the preparation of the block condensates with structural units of the formula (I) are monofunctional aromatic hydroxy compounds, such as 4-hydroxydiphenyl, p-nonylphenol, 4-(1.1.3.3-tetramethylene-ethyl)-phenol, chlorocarbonic acid esters, such as ethyl and phenyl chlorocarbonate, and aliphatic and aromatic carboxylic acid chlorides, such as stearyl chloride and naphthalenecarboxylic acid chlorides. The chain stoppers described in European Pat. No. A-36,080, for example p-isooctylphenol and p-isononylphenol, are particularly preferred.

They are used in amounts of 0.1 to 10 mol %, preferably 0.3 to 7 mol %, based on the diphenols employed.

Preferred branching agents for the preparation of the block condensates with structural units of the formula (I) are carboxylic acid chlorides which are trifunctional or more than trifunctional, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of 0.01 to 1.0 mol %, based on the diphenols employed, or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenol)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane and 1,4-bis-[(4,4"-dihydroxytriphenyl)-methyl]-benzene, in amounts of 0.01 to 1.0 mol %, based on the diphenols employed.

The incorporation of branching agents into polycarbonates, including that into segmented polyether-polycarbonates, by the phase boundary process is known (in this context, see DE-OS (German Published Specification) 1,570,533, U.S. Pat. No. Re. 27,682, DE-OS (German Published Specification) 26 36 784 (Le A 17 025) and DE-OS (German Published Specification) 2,726,376 (Le A 18 015)).

THE PRIOR ART

Mixtures of polycarbonates and polyesters are known (see, for example, German Patent Specification 1,187,793, DE-AS (German Published Specification) 1,694,124 and DE-OS (German Published Specification) 2,622,414).

Mixtures of polyesters and grafted polymers are likewise known (see, for example, U.S. Pat. Nos. 3,919,353 and 3,564,077, DE-OS (German Published Specification) 2,659,338 or U.S. Pat. No. 4,096,202 and DE-OS (German Published Specification) 2,726,256).

Mixtures of polycarbonates and polymers are likewise known (see, for example, Japanese Patent Publication No. 18,611/68 (Teijin, Priority 30.6.1965), U.S. Pat. No. 3,663,471, U.S. Pat. No. 3,437,631, U.S. Pat. No. 4,299,928 or DE-OS (German Published Specification) 3,114,494).

MIxtures of polycarbonates, polyesters and grafted polymers are likewise known (see, for example, U.S. Pat. No. 3,864,428 and DE-AS (German Published Specification) 2,343,609 or U.S. Pat. No. 4,264,487 and EP-OS (European Published Specification) 25,920 or U.S. Pat. No. 4,257,937 and EP-OS (European Published Specification) 20,605 and WO 80/00972 or German Patent Specification 1,569,448 and British Patent Specification 1,007,724).

Although moulding materials of polycarbonates, polyesters and elastomeric polymers have many positive properties, they are still in need of improvement, at least in one respect: their tack point is too low. By tack point is understood the temperature of injection mould surfaces above which injection mouldings adhere to the surfaces, so that release from the mould is made difficult and necessitates higher mould release forces. Injection moulds are usually cooled with water or oil. In complicated moulds, however, there are frequently regions (for example small cores) which cannot be cooled sufficiently and where the temperature rises rapidly due to the melt flowing in. If the tack point is reached in this manner, the cycle times must be increased to allow the mould time to cool between the injections.

BRIEF DESCRIPTION OF THE DRAWING

The mold release experiments were carried out with the device shown in principle in the FIGURE.

It has now been found that the tack point of moulding materials of polycarbonates, polyesters and elastomeric polymers is increased considerably by the addition of polycarbonate-polyphenylene oxide block condensates.

Thermoplastic moulding materials based on polycarbonate, polyalkylene terephthalate and, if appropriate, one or more polymers, the deformation characteristics of which are positively influenced in an exceptional manner by the presence of small amounts of o,o,o',o'-tetramethylenebisphenol polycarbonate are known from DE-OS (German Published Specification) 3,118,697 (Le A 21 047). However, no further details are given of the tackiness properties of such moulding materials in this DE-OS (German Published Specification), and the comment is merely made (page 26) that mould release agents can be added. Moulding materials based on polycarbonate, polyalkylene terephthalate and, if appropriate, an elastomeric polymer, the heat distortion resistance and deformation characteristics of which are improved by the addition of an aromatic thermoplastic based on a polyetherimide are known from European Patent Specification 0,133,236 (Le A 22 330-EP). Likewise, no further details are given of the tackiness properties of such moulding materials in this EP-OS (European Published Specification), and again the comment is merely made (page 24) that mould release agents can be added.

The moulding materials according to the invention can be prepared in the customary mixing units, such as roll mills, kneaders and single- and multi-screw extruders. The mixing temperatures are between 200° C. and 340° C., preferably between 220° C. and 300° C.

Although in most cases all the resin components are advantageously mixed in a single step, it can sometimes also be advisable first to leave out one or even two components and only to admix this or these at a later point in time.

In this connection, it has also been found that those moulding materials according to the invention which contain 0% by weight of component (C) have a somewhat modified pattern of properties in comparison with those moulding materials according to the invention which contain component (C), and in particular the former are less tough but have a higher heat distortion resistance and a higher stability under prolonged exposure to heat.

The moulding materials according to the invention can contain up to 5% by weight, based on a total weight of 100% by weight of components (A)+(B)+(C)+(D), of ethylene homo- or copolymer to increase the resistance to petrol. Ethylene copolymers in this context are polyethylenes, the radicals of which, in addition to ethylene radicals, consist to the extent of up to 30% by weight, based on the ethylene copolymer, of radicals of other copolymerizable monomers. Other copolymerizable monomers for the preparation of these ethylene copolymers are, for examle, (meth)acrylic acid and the monomers listed above for the preparation of the graft base and graft for component (C).

If appropriate, the moulding materials according to the invention can contain the customary additives for polycarbonates and/or polyesters, such as nucleating agents, stabilizers, fillers and reinforcing substances, flameproofing agents and/or dyestuffs.

The filled or reinforced moulding materials can contain up to 60% by weight, based on the reinforced moulding material, of fillers and/or reinforcing substances. Preferred reinforcing substances are glass fibres. Preferred fillers, which can also have a reinforcing action, are glass beads, mica, silicates, quartz, titanium dioxide and wollastonite.

The polyester moulding materials finished with flame-proofing agents contain flameproofing agents in a concentration of in general less than 30% by weight, based on the flameproofed moulding materials.

The flameproofing agents known for polycarbonates or polyesters or elastomeric polymers are possible, such s for example, polyhalogenodiphenyls, polyhalogenodiphenyl ethers, polyhalogenophthalic acids and their derivatives and polyhalogeno-oligo- and -polycarbonates, the corresponding bromine compounds being particularly effective. They also as a rule contain a synergist, for example antimony trioxide.

The moulding materials according to the invention can be processed to shaped articles at temperatures from 220° C. to 340° C., and in particular both by the injection moulding process and by the extrusion process, and in particular to any desired type of shaped articles, for example to sheets or films.

The shaped articles obtainable from the moulding materials according to the invention are used, for example, in the electrical engineering and motor vehicle industry.

The parts mentioned in the following examples are parts by weight. Percentages relate to the weight.

EXAMPLES

Components used:

I. Polycarbonate of bisphenol A, phenol and phosgene, relative viscosity 1,285, measured in methylene chloride at 25° C. in 0.5% strength solution.
II. Polybutylene terephthalate with an intrinsic viscosity of 1,18 dl/g, measured in phenol/o-dichlorobenzene (weight ratio 1:1) at 25° C. in an Ubbelohde viscometer.
III. Polyethylene terephthalate with an intrinsic viscosity of 0,78 dl/g, measured as for II.
IV. Terpolymer of ethylene, acrylic acid and tert.-butyl acrylate in a weight ratio of 89/4/7 with a melt index of 6–8 g/10 minutes (measured at 190° C. under a load of 2,16 kp in accordance with DIN 53 735) and a density of 0.924 g/cm$^3$ (measured in accordance with DIN 53 479).
V. Graft polymer, 80% of graft base of croslinked polybutadiene (gel content of more than 70%, measured in toluene) and 20% of graft of methyl methacrylate.
VI. Graft polymer, 80% of graft base of crosslinked polybutadiene (gel content of more than 70%, measured in toluene) and 20% of graft of 72 parts of styrene and 28 parts of acrylonitrile.
VII. Graft polymer with a core-jacket structure of the following composition, expressed in weight ratios of the monomers which form it: n-butyl acrylate/butane-1,3-diol diacrylate/diallyl maleate/methyl methacrylate=79.2/0.4/0.4/20.0.

VIII. Graft polymer with a core-jacket structure, prepared by the following multi-stage process.

1. Preparation of the graft base 1.1 Preparation of a polybutadiene latex

An emulsion of the following composition is polymerized at 65° C. in a reactor in the course of about 22 hours, with stirring, until conversion of the monomer is complete.

100 parts of butadiene, 1.8 parts of the Na salt of disproportionated abietic acid, 0.257 part of sodium hydroxide, 0.3 part of n-dodecylmercaptan, 1.029 parts of Na ethylenediaminetetraacetate, 0.023 part of potassium persulphate and 176 parts of water.

A latex containing polybutadiene particles with an average diameter ($d_{50}$) of 0.1 μm in a concentration of about 36% is obtained.

1.2 Preparation of an acrylate rubber containing polydiene cores

The following mixture is initially introduced into a reactor at 63° C., with stirring: 200 parts of latex 1.1, 5,000 parts of water, 14 parts of potassium persulphate, 0.9124 part of triallyl cyanurate and 399.09 parts of n-butyl acrylate.

The following mixtures are metered separately into the reactor at 63° C. in the course of 5 hours:

Mixture 1:
90 parts of Na $C_{14}$–$C_{18}$-alkylsulphonate and
11,900 parts of water.

Mixture 2:
23.09 parts of triallyl cyanurate and
10,101 parts of n-butyl acrylate.

The mixture is then allowed to polymerize completely at 65° C. for 2 hours. The polymers formed have gel contents of 85–95% and average particle diameters ($d_{50}$) of 0.5 μm (polymer content in the latex: 38%).

2.1 Preparation of the emulsion graft polymers 2.1.1 Emulsion graft polymer of 90% of acrylate rubber 1.2 and 10% of styrene+acrylonitrl.

The following components are initially introduced into a reactor: 3,296 parts of latex 1.2, 1.5 parts of potassium persulphate and 90 parts of water.

The followng mixtures are metered separately into the reactor at 65° C.:

Mixture 1:
39 parts of acrylonitrile and
100 parts of styrene and

Mixture 2:
150 parts of water and
4 parts of Na $C_{14}$–$C_{18}$-alkyl sulphonate.

The mixture is then allowed to polymerize completely at 65° C. for 4 hours (polymer content in the latex: 37.8%).

2.2 Preparation of graft polymer C from the emulsion graft polymer.

The following components are initially introduced into a reactor at 70° C.: 18,800 parts of water and 240 parts of magnesium sulphate.

While stirring, 11,200 parts of latex 2.1.1 are now allowed to run into the reactor in the course of 2 hours.

When the addition has ended, 1 part of potassium persulphate is added to the reactor; 148 parts of acrylonitrile and 381 parts of styrene are then metered in uniformly in the course of 1 hour, while stirring. The suspension is subsequently stirred at 90° C. for 1 hour. Polymer C is then isolated.

IX. Preparation of monofunctional polyphenylene oxide segments a. $M_n$ about 1,500

6 g of CuCl, 30 g of 4-dimethylamino-pyridine and 1,400 ml of chlorobenzene were mixed and air was blown through the mixture for 2 hours (150 l/hour) at a layer height of about 10 cm.

After addition of 1,200 g of 2,6-dimethylphenol and 6,600 ml of chlorobenzene, further air was blown in (150 l/hour) at a layer height of about 45 cm. The temperature of the reaction mixture rose from initially 21° C. to 29° C.

After 16.5 hours, the solid in the solution still contained 1.28% by weight of OH groups. The oxidation was discontinued and the reaction mixture was stirred intensively with a mixture of 10 l of $CH_3OH$ and 200 ml of 40% strength aqueous HCl. The polyphenylene oxide precipitated was filtered off with suction, washed with $CH_3OH$ and then with water and dried in a vacuum drying cabinet at 60° C. The yield was 1,014 g, about 82% of theory. The molecular weight determination by osmometry in $CH_2Cl_2$ gave an $M_n$ of 1,513.

b. $M_n$ about 4,500

A batch as described under a was discontinued only when the solid in the solution contained 0.39% by weight of OH. The yield was 1,052 g=about 85% of theory. The $M_n$ was 4,567.

X. Preparation of bifunctional polyphenylene oxide segments a. $M_n$ about 800

10 g of CuCl, 50 g of 4-dimethylamino-pyridine and 1,500 ml of chlorobenzene are mixed and air is passed through for 2 hours (150 l/hour) at a layer height of about 10 cm.

After addition of 977 g of 2,6-dimethylphenol and 568 g of 2,2-bis-(3,5-dimethyl-4-hydroxyphenyl)-propane as well as 7,000 ml of chlorobenzene, further air (150 l/hour) was blown into the solution at a layer height of about 50 cm. The temperature of the reaction mixture rose from initially 20° C. to 31° C. The reaction was discontinued when an OH content of the solid of 4.2% by weight was reached, and the solution was washed with aqueous solution of trisodium salt of ethylene-diamine-tetra-acetic acid with dilute HCl, aqueous $NaHCO_3$ solution and water.

The bifunctional polyphenylene oxide which remained on evaporation of the solution had an $M_n$ (determined by osmometry in $CH_2Cl_2$ solution) of 796.

Analysis by gel chromatography showed only about 1.3% by weight of monofunctional constituents.

b. $M_n$ about 1,250

15 g of CuCl, 35 g of 4-dimethylamino-pyridine and 1.5 l of chlorobenzene were mixed and air was passed through the mixture for 1 hour (100 l/hour) at a layer height of about 10 cm.

After addition of 285 g of 2,2-bis-(3,5-dimethyl-4-hydroxyphenyl)propane, 977 g of 2,6-dimethylphenol and 7.7 l of chlorobenzene, 100 l/hour of air were passed in.

The temperature thereby rose from initially 20° C. to 28° C. The reaction was discontinued when an OH content of the solid of about 2.8% by weight was reached.

Working up of the batch was as described under a.

The $M_n$ of the product was about 1,260. The product contained about 2% by weight of monofunctional constituents.

XI. Preparation of polycarbonate-polyphenylene oxide block co-condensates (a) from IXa:

1,598 g (7 moles) of bisphenol A and 800 g (20 moles) of NaOH were dissolved in 45 l of water under $N_2$. After addition of 30 l of $CH_2Cl_2$ containing 525 g (0.35 mole) of monofunctional polyphenylene oxide IX a, 1.3 kg $COCl_2$ were introduced within 1 hour under violent stirring, whereas the pH being maintained at 13 to 14 and the temperature being maintained at 20° to 22° C.

After addition of 40 ml of N-ethylpiperidine, the mixture was subsequently stirred at pH 13-14 for 1 hour.

The phases were then separated, the organic phase was washed, half the solvent was distilled off therefrom and the block co-condensates was precipitated with isopropanol and dried in vacuo at 100° C.

Yield: 2,136 g, $\eta_{rel}$=1.31 (measured on a solution of 0.5 g of product in 100 ml of $CH_2Cl_2$ solution).

(b) from IXb:

XIa was repeated, but 1,600 g (0.355 mole) of IXb were employed instead of IXa and the reaction was carried out in a higher dilution (60 l of $CH_2Cl_2$ instead of 30 l in comparison with XIa).

1.6 kg of $COCl_2$ were furthermore used (instead of 1.3 kg). The yield was 3,283 g. The $\eta_{rel}$ was 1.346.

(c) from Xa:

1,598 g (7 moles) of bisphenol A and 800 g of NaOH were dissolved in 45 l of water under $N_2$.

After addition of 50 l of $CH_2Cl_2$, with 1,600 g (2 moles) of Xa dissolved therein, and 54.1 g (4 mol %) of tert.-butylphenol, 1.3 kg of phosgene were passed in over a period of 1 hour, with vigorous stirring. Further processing was as described under XIa. The yield was 3,286 g, $\eta_{rel}$=1.306.

(d) from Xb:

XIc was repeated, but 2,500 g Xb were employed instead of Xa.

The yield was 4,176 g, $\eta_{rel}$ was 1.336.

The composition of the compound mixtures and the association tack points are summarized in Table 1.

The mould release experiments were carried out with the device shown in principle in FIG. 1. When the injection mould is opened after the injection operation, the moulding (cone) remains on the core K and is pushed away from this with the ejector A. Above the tack point, the mouldings are destroyed when pushed away from the core K.

Details of mould release testing are to be found in "Kunststoffe" [Plastics] 66 (1976) page 210.

In FIG. 1: the numbers have the following meanings: 1 hydraulic ejector, 2 mechanical pressure recorder, 3 load cell (wire strain gauge), 4 liquid oscillograph, 5 injection mould, 6 thermostats, 7 temperature recorder, 8 injection unit, 9 insertion pyrometer, 10 revolution counter.

We claim:

1. Thermoplastic moulding materials containing (A) 98 to 1% by weight of thermoplastic, aromatic polycarbonates with weight-average molecular weights Mw of between 10,000 and 200,000 (Mw determined by Light scattering), (B) 1 to 98% by weight of thermoplastic polyalkylene terephthalates and, (C) 0 to 30% by weight of an elastomeric polymer with a glass transition temperature of less than −20° C. which contains at least two copolymerized monomers selected from the group consisting of chloroprene, butadiene, isoprene, isobutene, styrene, acrylonitrile, ethylene, propylene, vinyl acetate and (methy)acrylic acid esters with 1 to 18 carbon atoms in the alcohol component; and (D) 1 to 30% by weight of a polycarbonate-polyphenylene oxide block co-condensate which contains 5% by weight to 95% by weight, based on the total weight of bifunctional structural units of the block condenstate, of structural units of the formula

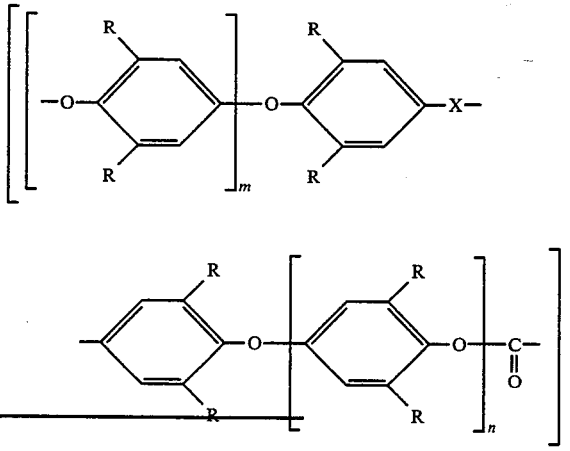

TABLE 1

| Examples | | I | II | III | IV | V | VI | VII | VIII | IXb | Xa | XIa | XIb | XIc | XId | Tacky point °C. |
|---|---|---|---|---|---|---|---|---|---|---|---|---|---|---|---|---|
| Comparison | 1 | 50 | 38 | | | | 12 | | | | | | | | | 85 |
|  | 2 | 50 | 38 | | 12 | | | | | | | | | | | 82 |
| Examples | 3 | 50 | 38 | | 12 | | | | | | | | | | | 88 |
|  | 4 | 50 | | 38 | | | | 12 | | | | | | | | 83 |
|  | 5 | 50 | | 38 | | | | | 12 | | | | | | | 84 |
|  | 6 | 40 | 38 | | | | | 12 | | 10 | | | | | | 93 |
|  | 7 | 40 | | 38 | | | 12 | | | | 10 | | | | | 95 |
|  | 8 | 50 | 40 | | | | | | | | | 10 | | | | 97 |
| Examples according to the invention | 1 | 40 | 38 | | | | 12 | | | | | | 10 | | | 131 |
|  | 2 | 40 | 38 | | 12 | | | | | | | 10 | | | | 129 |
|  | 3 | 40 | 38 | | 12 | | | | | | | | 10 | | | 133 |
|  | 4 | 40 | | 38 | | | | 12 | | | | | | 10 | | 138 |
|  | 5 | 40 | | 38 | | | | | 12 | | | | | | | 132 |
|  | 6 | 30 | 38 | | | | | 12 | | 10 | 20 | | | | | 145 |
|  | 7 | 30 | | 38 | | | 12 | | | | | 20 | | | | 141 |
|  | 8 | 40 | 40 | | | | | | | | | | | | 20 | 144 | wherein the radicals R are identical or different and represent hydrogen or an alkyl radical with 1 to 4 carbon atoms, X represents a group R—C—R, —O— or —SO$_2$— and m and n each represent an integer from 1 to 200, and 95% by weight to 5% by weight, based on the total weight of bifunctional structural units of the block condensate, of other structural units of the

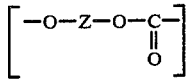

wherein —O—Z—O— is a diphenolate radical which has 6 to 30 carbon atoms;

and wherein the sum of the percentages by weight of components (A)+(B)+(C)+(D) in each case being 100% by weight.

2. Moulding materials according to claim 1, characterized in that they contain 78 to 20% by weight of (A), 20 to 78% by weight of (B), 1 to 20% by weight of (C) and 1 to 20% by weight of (D).

3. Moulding materials according to claim 1, characterized in that they contain 64 to 30% by weight of (A), 30 to 64% by weight of (B), 3 to 12% by weight of (C) and 3 to 15% by weight of (D).

4. Moulding materials according to claim 1 also containing at least one member selected from the group consisting of ethylene homopolymer, ethylene copolymers, nucleating agents, stabilizers, fillers, reinforcing substances, flameproofing agents and dyestuffs.

* * * * *